United States Patent [19]

Bays et al.

[11] Patent Number: 4,788,693
[45] Date of Patent: Nov. 29, 1988

[54] DATA COMMUNICATION REPLICATOR

[75] Inventors: Laurence E. Bays, Whitehall, Pa.; Walter P. Hays, III, Rumson, N.J.

[73] Assignee: American Telephone and Telegraph Company, AT&T Bell Laboratories, Murray Hill, N.J.

[21] Appl. No.: 782,058

[22] Filed: Sep. 30, 1985

[51] Int. Cl.[4] .................. H04K 1/10; H04L 27/28
[52] U.S. Cl. .................................. 375/38; 370/83
[58] Field of Search .............. 375/8, 38, 82, 102; 371/68; 364/200, 900; 370/16, 85, 83; 358/260, 261; 455/62

[56] References Cited

U.S. PATENT DOCUMENTS

| | | | |
|---|---|---|---|
| 3,564,144 | 2/1971 | Diggelmann | 370/83 |
| 4,125,746 | 11/1978 | Downey et al. | 370/83 |
| 4,335,448 | 8/1982 | Baxter et al. | 370/81 |
| 4,336,613 | 6/1982 | Hewes | 375/82 |
| 4,386,373 | 5/1983 | Kondo et al. | 358/261 |
| 4,417,334 | 11/1983 | Gunderson et al. | 340/825.01 |
| 4,543,651 | 9/1985 | Chang | 370/16 |
| 4,553,268 | 11/1985 | Tilly | 455/612 |
| 4,569,018 | 2/1986 | Hummel et al. | 364/200 |

FOREIGN PATENT DOCUMENTS 982271  1/1976  Canada.

Primary Examiner—Robert L. Griffin
Assistant Examiner—Stephen Chin
Attorney, Agent, or Firm—James H. Fox

[57] ABSTRACT

A data bus having a given size (e.g., 32 bits) provides for transfer of information between various logic and memory elements within, or among, one or more integrated circuits. Certain of the information transfers require the full information path, while others use only a portion (e.g., 8 or 16 bit transfers). To expedite the transfers of the smaller size words, a given word is replicated to fill up the full data base. This avoids the necessity of specifying the exact location of the smaller word on the data bus.

12 Claims, 5 Drawing Sheets

GROUP REPLICATIONS

GROUP 0 REPLICATOR

CONTROL CIRCUIT

FIG. 5

| CASE | UM3 | UM2 | UM1 | UM0 | REMARKS |
|------|-----|-----|-----|-----|---------|
| 1 | 1 | 1 | 1 | 0 | 8 BIT WORD ON GROUP 0 |
| 2 | 1 | 1 | 0 | 1 | 8 BIT WORD ON GROUP 1 |
| 3 | 1 | 0 | 1 | 1 | 8 BIT WORD ON GROUP 2 |
| 4 | 0 | 1 | 1 | 1 | 8 BIT WORD ON GROUP 3 |
| 5 | 1 | 1 | 0 | 0 | 16 BIT WORD ON GROUPS 0 AND 1 |
| 6 | 0 | 0 | 1 | 1 | 16 BIT WORD ON GROUPS 2 AND 3 |
| 7 | 0 | 0 | 0 | 0 | 32 BIT WORD ALL DRIVERS DISABLED |
| 8 | 1 | 1 | 1 | 1 | NO WORD; DON'T CARE.; ALL DRIVERS ENABLED, NO INPUTS SELECTED |

DATA COMMUNICATION REPLICATOR

BACKGROUND OF THE INVENTION

1. Field of the Invention

The present invention relates to a technique for communicating within or among one or more integrated circuits by means of a data bus.

2. Description of the Prior Art

An integrated circuit that includes both logic and memory portions frequently also includes a data bus for communication among the various portions. A data bus includes a given number of electrical conductors (e.g., 32) that define the maximum word size that can be transferred at one time. The simultaneous transfer of bits is sometimes referred to as a "parallel" transfer in the art. In typical prior art designs, all of the logic and memory portions of the circuit transferred the same number of bits; that is, they had the same word size. In some cases, a word was broken down into smaller portions for transfer; i.e., a 32 bit word was divided into two 16 bit segments for two sequential parallel transfers over the data bus.

SUMMARY OF THE INVENTION

We have invented a technique for transferring data words of different sizes in a data system comprising one or more integrated circuits. In the present technique, data words having a size less than that of a data bus are replicated for parallel transmission on the data bus.

BRIEF DESCRIPTION OF THE DRAWINGS

FIG. 5 shows a logic diagram describing possible word replications.

DETAILED DESCRIPTION

The following detailed description relates to a technique for communicating data words of different sizes within or between integrated circuits. The present technique is useful, for example, in a digital signal processor integrated circuit wherein logic circuits utilizing various word sizes communicate with a random access memory.

Figure 1:
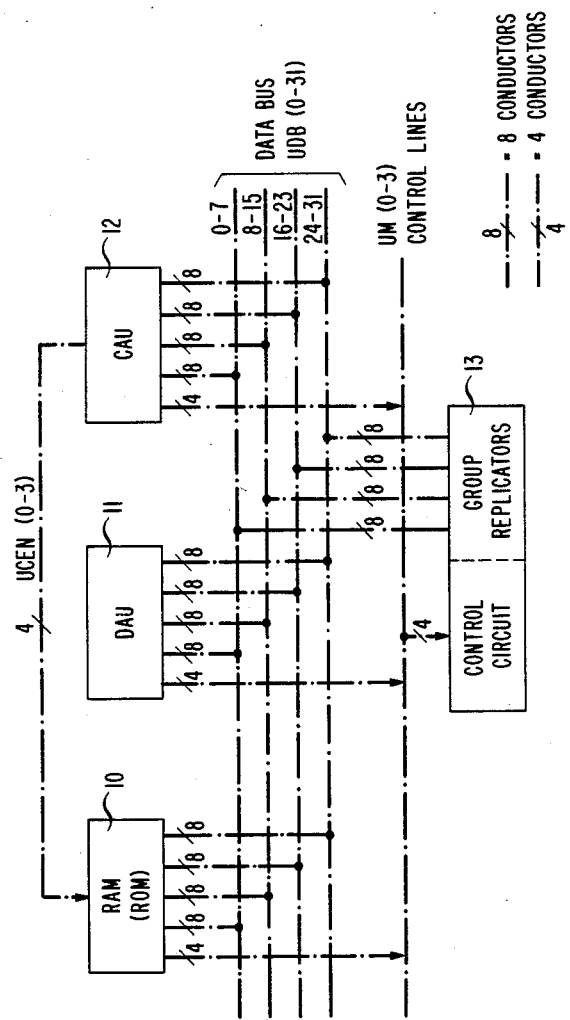
FIG. 1 shows a block diagram of an integrated circuit utilizing the present technique.

Referring to FIG. 1, a data bus UDB comprising 32 conductors (00-31) provides for communication among a memory 10, a Digital Arithmetic Unit (DAU) 11, and a Control Arithmetic Unit (CAU) 12. The memory is typically a Random Access Memory (RAM), but may alternately be a Read Only Memory (ROM) or other type. Also, other logic circuit types are possible in lieu of, or in addition to, the DAU and the CAU. The data bus is shown as grouped in four groups of eight lines each, although physically the lines are typically evenly spaced. The groups are labelled 0, 1, 2 and 3 herein. The data bus may reside entirely on a single integrated circuit (IC) chip or wafer, or alternately may be located externally to a given IC to provide communication with another IC chip or wafer.

The present invention provides for the inclusion of a replicator circuit (13) that replicates the information from at least one of the UDB groups onto at least one other of the UDB groups. The replicator is controlled by control lines UM0 . . . UM3 which are connected to the source of the information (e.g., the RAM) for a given transfer. The control signals applied to the UM lines then provide for replicating the information from the one or more UDB lines on which it originates onto the remaining UDB lines. For example, consider a given data transfer that provides that the RAM place an 8 bit word (i.e., a byte) onto data bus lines UDB8 . . . UDB15 (group 1). For this purpose, the CAU provides the address of the desired (32 bit) memory location to the RAM. The CAU also provides a control signal on the UCEN (0-3) lines connected to the RAM for specifying the size (e.g., 8 bits) and position (e.g., group 1) of the word within that (32 bit) location. The RAM then activates control line UM1, which causes the replicator to replicate that 8 bit word onto the remaining data bus lines UDB0 . . . UDB7 and UDB16 . . . UDB31 (groups 0, 2 and 3). In a second example, if the RAM is directed to place data on bus lines UDB0 . . . UDB15 (groups 0 and 1), then the replicator duplicates this data onto bus lines UDB16 . . . UDB31 (groups 2 and 3).

The advantages of the present technique relate to the fact that in certain data transfers, the destination of the requested data, for example the DAU, is adapted to accept the data only from certain of the data bus lines. For example, in the above-noted transfers, the DAU can look for the requested data on different bus lines than those on which it was placed by the RAM. The replicator technique has been found by the present inventors to provide for rapid transfer of the data with minimal design complexity in such cases. Otherwise, one can envision a scheme wherein the data is tagged with the location it was placed on the data bus, so that the destination can retrieve it from that location. However, that scheme has been found to typically slow up the operation of the data transfer as compared to the inventive technique and to add additional design complexity. This can be appreciated when it is realized that to tag the data with its location on the bus, the data requesting portion of the circuit must not only originate (i.e., encode) the location tag, but the destination portion of the circuit must recognize (i.e., decode) the location tag and act on it by being capable of receiving the data from every portion of the bus. In contrast, the present technique requires only an encode operation, and a replicate operation, which is relatively speedy. The "encode" operation then relates to instructing the replicator which data bus lines have information that is to be replicated onto the other bus lines. Furthermore, the replicator logic can be centralized and shared by all subsystems, minimizing design complexity and chip area.

Figure 2:
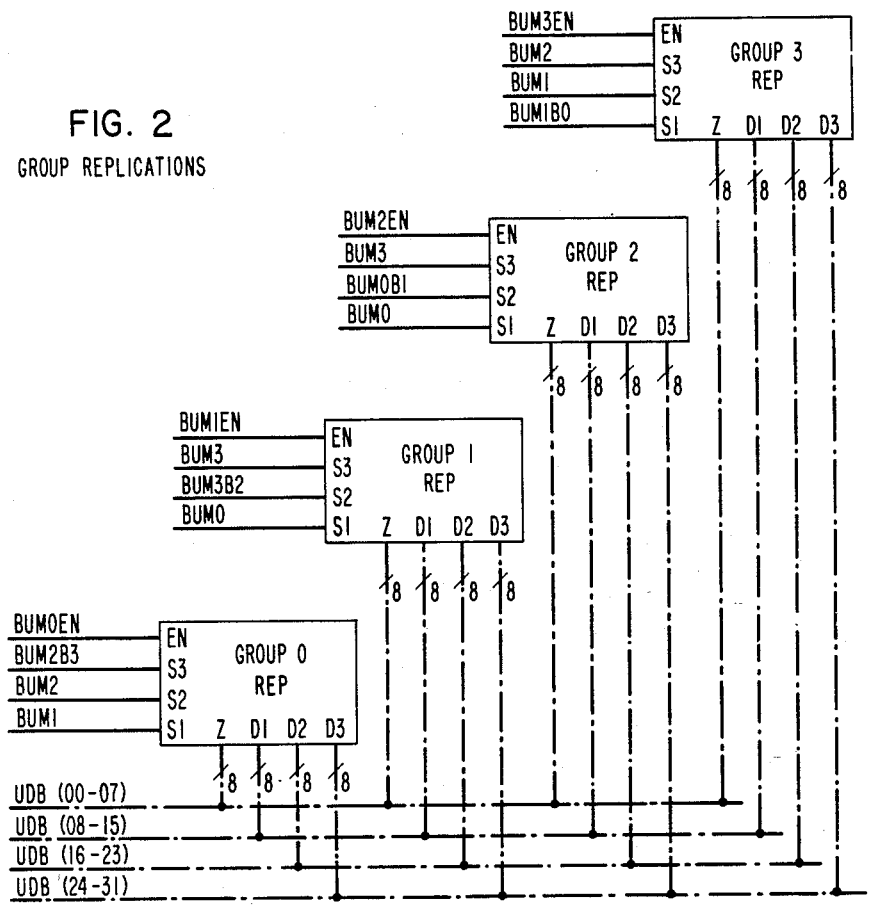
FIG. 2 shows a data word replicator arranged in four groups for use with the present technique.

Referring to FIG. 2, a more detailed representation of the replicator is shown. Each group of lines is connected to a group replicator via the "Z" output thereof. Each group replicator has data inputs D1-D3 that connect to the other three groups of bus lines. For example, group replicator 0 has its Z output connected to group 0, whereas its data input lines D1, D2, and D3 are connected to groups 1, 2 and 3, respectively. Similarly, group replicator 1 has its Z output connected to group 1, whereas its data inputs D1, D2 and D3 are connected to groups 0, 2 and 3. Each group replicator also has control inputs S1, S2, and S3, as well as enable input EN. The control inputs receive the control signals BUM from the "group control" portion of the replicator (FIG. 4).

Figure 3:
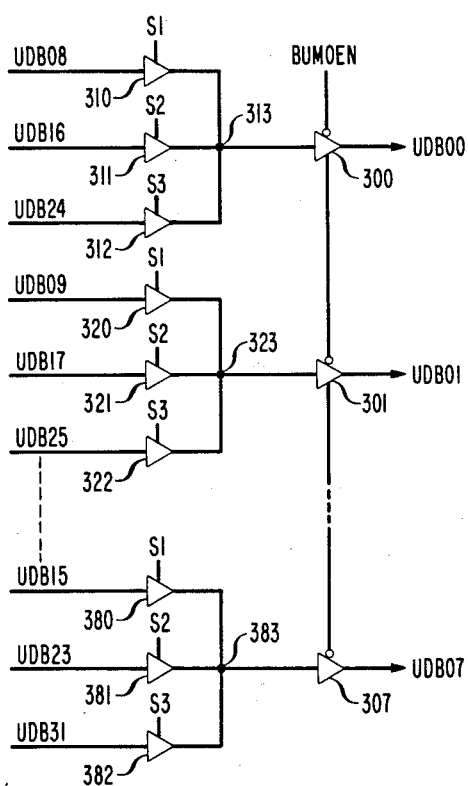
FIG. 3 shows a single one of the group replicators of FIG. 2, being the "group O" replicator.

An example of a group replicator is shown in FIG. 3, which illustratively shows the "group 0" replicator. Note that the group replicator has eight outputs (UDB-00–UDB07 labelled collectively "Z" in FIG. 2), one output for each data bus conductor of the given group. In addition, each group replicator has twenty-four data inputs (UDB08–UDB31, labelled D1–D3 in FIG. 3), which are connected to the data bus lines of the other groups. Each UDB input line (e.g., UDB08) connects to a transfer gate (e.g., 310) which is controlled by a control input (e.g., S1). The transfer gate (310) allows the data input signal to pass through to the output (e.g., node 313) when the control signal (S1) is low. The outputs of three input gates (e.g., 310, 311, 312) are connected to a common node (e.g., 313), which connects to the input of the output gate (e.g., 300). The output gate allows data to pass from its input (e.g., node 313) to its output (e.g., UDB00) when its enable input (e.g., (BUM0EN) is low; i.e., the gate is "enabled". When the enable input is high, the associated output gate is disabled, and its output is placed in a high-impedance condition (the "tristate" condition). The tristate condition prevents a given output gate from driving the associated UDB conductor. It can be seen from FIG. 3 that the activation of any one of the control inputs (S1, S2, or S3) thereby allows data from any one of the other three groups (1, 2, or 3) to be replicated onto the group 0 lines when the control enable (BUM0EN) signal activates the output gate. The other group replicators are formed in a similar manner.

Figure 4:
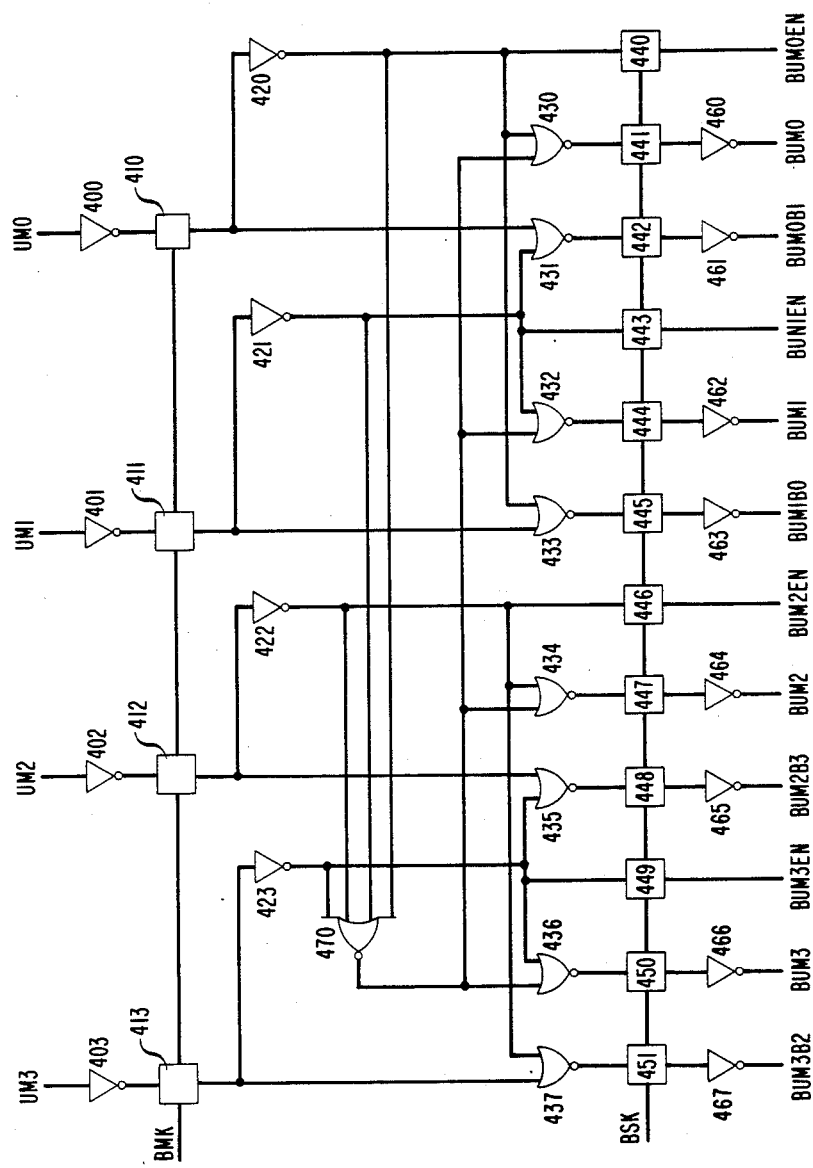
FIG. 4 shows control circuitry for the replicator of FIG. 2.

The control circuit of FIG. 4 selects one or more groups replicators to replicate the data present on their data inputs from a given group onto at least one other group when the data word does not fill all the bus lines. When a data word fills the bus lines (i.e., a 32 bit word), the control circuit maintains the replicators inactive. The inputs to the control circuit are UM0 . . . UM3, and are provided by the source of the data, for example the RAM, for a given transfer operation, as noted above. The clocks BMK (master) and BSK (slave) control the associated transfer gates, 410–413 and 440–451, respectively. The gates 440–451 are inverting gates, whereas 410–413 are non-inverting. The outputs of the control circuit are the BUM lines, which are connected to the control inputs (S1, S2 ad S3) and the output enable input (EN) of the group replicators as indicated in FIG. 2. A high voltage on a control input allows data to pass through the input gate, whereas a low voltage on the output enable input allow the data to pass onto the associated group in the illustrative circuit. Which of the BUM lines is activated then determines which one of the groups a given replicator will replicate. For example, if line BUM3 and BUM2EN are activated (i.e., BUM3 high and BUM2EN low), then group replicator 2 will replicate the data on group 3 (bus lines UDB24 . . . UDB31) onto group 2 (bus lines UDB16 . . . UDB23).

The operation of the replicator is further illustrated in FIG. 5. This shows the data transfers resulting from all possible states of the UM lines. When valid data is present on a given group, the source of the data to be transferred places the UM line associated with that group in a low voltage (0) state; otherwise, it remains in a high voltage (1) state. For example, when data is read from the data source (e.g., the RAM) onto group 0, the UM0 line goes low (0), while the UM1, UM2 and UM3 lines remain high (1). This causes the outputs of the control circuit (FIG. 4) to be as follows: BUM0 = BUM1B0 = BUM0EN = (high state); all other control lines low state. Then, the high BUM0EN disables the Z output of replicator 0 by turning off its output transfer gate. The low BUM1EN, BUM2EN and BUM3EN control lines turn on the output transfer gates of group replicators 1, 2 and 3, respectively. Furthermore, the high BUM0 and BUM1B0 turns on the input transfer gates in group replicators 1, 2 and 3 that are connected to group 0. (The remaining low BUM lines keep the transfer gates connected to the other groups off.) Hence, group 0 is transferred through the "on" transfer gates in group replicators 1, 2 and 3 onto their respective bus line groups, and thereby replicated.

Referring again to FIG. 5, it can be seen that all other replicate operations can also be described in terms of the states of the UM lines. There are two special cases of interest: when all the UM lines are low (0), as is the case when a full 32 bit word is to be transferred over the data bus, then all of the replicators are turned off by signals BUM0EN, BUM1EN, BUM2EN and BUM3EN being high. Furthermore, the output of the NOR gate 300 (FIG. 3) is then (and only then) in the high state. This places lines BUM0, BUM1, BUM2, and BUM3 in the low state, thereby turning off their associated transfer gates. This prevents possible shorting of the data signal through the transfer gates. Hence, the data placed on the bus is neither replicated nor otherwise affected by the group replicators in this case. In the second special case, when all of the UM lines are high (1), as when no data is being transferred, then all of the output transfer gates are turned on (enabled) by their respectve output enable control lines BUM0EN, BUM1EN, BUM2EN and BUM3EN. However, all of the input control lines are low, thereby disabling the input gates. Hence, no data is transferred from one group to another by any of the group replicators.

While the present technique has been illustrated in terms of a 32 bit maximum word length and 8 bit and 16 bit smaller words, other lengths are of course possible and included herein. Furthermore, while the largest word length is typically an integer multiple of the smaller words, this need not be the case. For example, a 12 bit word can be replicated twice onto a 32 bit data bus, with the remaining 8 lines being either left empty or filled with a portion (e.g., the first or last 8 bits) of the 12 bit word.

In addition, the use of a single replicator circuit (divided into four group replicators) has been illustrated herein. This is most useful when the sources and destinations of the data, and hence the data bus, are all located on a single integrated circuit. However, the use of multiple replicators is also possible. For example, a separate replicator may be provided for each of the data sources. This may be preferable for communication over a data bus connecting sources and destinations on different integrated circuits, although a single replicator could be used in that case also. Also, the replicator illustrated herein comprises group replicators each having an output associated with a single group of data bus lines, and inputs associated with the other groups. However, the opposite implementation is alternately possible. That is, a group replicator may have an input associated with a single group and outputs associated with the other groups. The adaptation of the control circuitry thereto is straightforward. Finally, although the description herein has been in terms of electrical conductors for the data bus, the use of optical conductors (e.g., waveguides or optical fibers) for the data bus is possible and included herein.

What is claimed is:

1. A data system comprising:
   a data bus adapted to transmit data words of differing sizes;
   a data source adapted to transmitting in parallel the bits of a data word on a first group of conductors of said bus;
   a destination adapted to receiving in parallel data bits from a second group of conductors of said bus;
   a replicator for replicating the bits of said data word;
   and control means adapted to receive from said data source the location of said first group of conductors on said bus, and to cause said replicator to replicate the bits of said data word onto said second group of conductors.

2. The system of claim 1 wherein said replicator comprises at least two group replicators, wherein said group replicators each have an output associated with a corresponding group of said conductors, and wherein said group replicators each have at least one input associated with a different group of said conductors.

3. The system of claim 1 wherein said replicator is a single circuit shared by a first data source adapted for transmitting on said first group of conductors and by a second data source adapted for transmitting on said second group of conductors.

4. The system of claim 1 wherein said replicator produces an integral multiple of said data bits.

5. The system of claim 1 further comprising at least one data source adapted to transmitting in parallel a number of data bits equal to the number of conductors of said bus.

6. The system of claim 1 wherein said data bus, said data source, said destination, said replicator, and said control means are all located on the same integrated circuit.

7. The system of claim 1 wherein said data source is located on a given integrated circuit, and at least a portion of said data bus is external to said given integrated circuit.

8. The system of claim 1 wherein said conductors are electrical conductors.

9. The system of claim 1 wherein said conductors are optical conductors.

10. The system of claim 1 wherein said first group of conductors is eight conductors.

11. The system of claim 1 wherein said first group of conductors is sixteen conductors.

12. The system of claim 1 wherein said data bus has 32 conductors.

* * * * *